C. A. HAGADONE.
TONGUE TRUCK.
APPLICATION FILED JAN. 27, 1913.
1,110,298.
Patented Sept. 8, 1914.
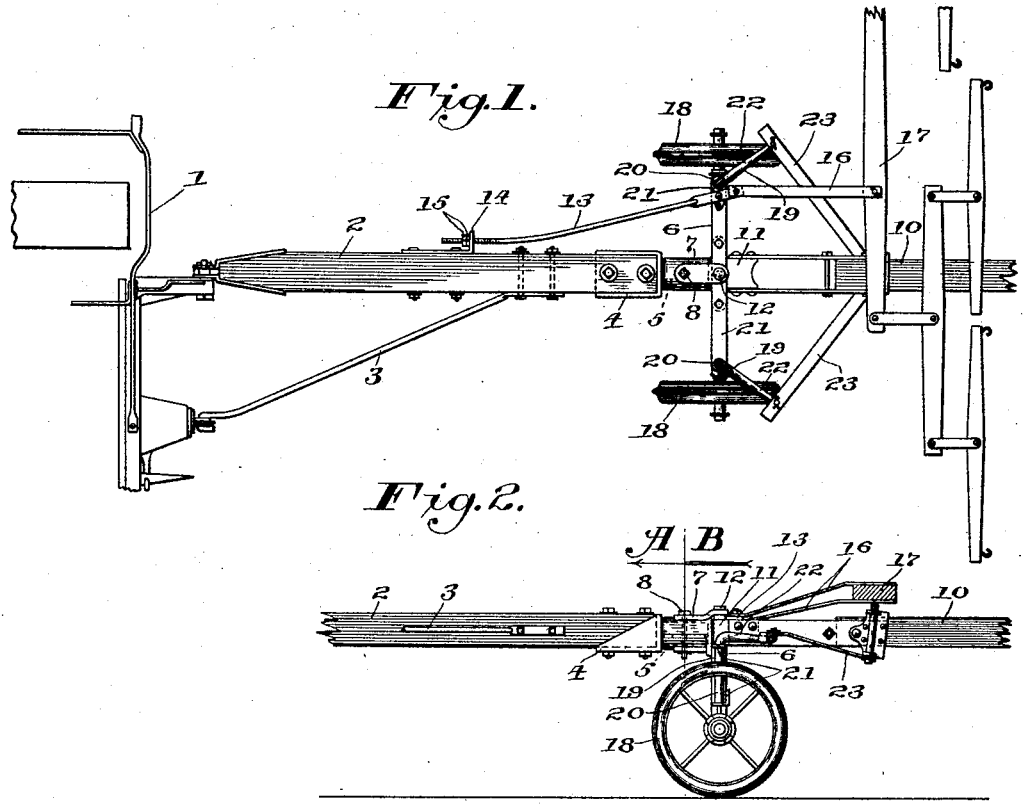
Witnesses:
C. C. Palmer
F. W. Hoffmeister
Inventor.
Clinton A. Hagadone,
By Chas. E. Lord
Atty.

UNITED STATES PATENT OFFICE.

CLINTON A. HAGADONE, OF WESTERN SPRINGS, ILLINOIS, ASSIGNOR TO INTERNATIONAL HARVESTER COMPANY, A CORPORATION OF NEW JERSEY.

TONGUE-TRUCK.

1,110,298. Specification of Letters Patent. Patented Sept. 8, 1914.

Application filed January 27, 1913. Serial No. 744,400.

*To all whom it may concern:*

Be it known that I, CLINTON A. HAGADONE, a citizen of the United States, residing at Western Springs, in the county of Cook and State of Illinois, have invented certain new and useful Improvements in Tongue-Trucks, of which the following is a full, clear, and exact specification.

My invention relates to tongue trucks such as are commonly used in connection with harvesting and tillage implements, and consists particularly in means whereby the truck axle may tip in a vertical plane to a limited extent about its connection with the implement; the object of my invention being to provide a construction having a wide degree of flexibility, and efficient in operation. I attain these results by means of mechanism one embodiment of which is illustrated in the accompanying drawings, in which—

Figure 1 is a top plan view of a truck connected with a harvester in accordance with my invention; Fig. 2 is a side elevation of part of Fig. 1; and Fig. 3 is a cross section of part of Fig. 2 on an enlarged scale on line A—B.

The same reference numerals designate like parts throughout the several views.

1 represents part of the wheeled frame of a harvester, 2 a stub tongue, and 3 a brace member secured to the stub tongue, the rear ends of the tongue and brace being pivotally connected with the wheeled frame of the harvester in a common way, permitting the harvester to be tilted to move the cutting apparatus toward or from the ground.

4 represents a draft member in which the front end of the stub tongue is seated and which is provided with a forwardly extending cylindrical portion 5.

6 represents a truck axle member that is connected intermediate the ends thereof with the cylindrical portion 5 of the draft member 4 by means of a block 7 secured to the axle member and provided with an opening that receives the cylindrical portion 5, and a pin 8 is placed vertically through the block and through an opening 9 in the cylindrical part 5; the opening 9 being elongated laterally at opposite ends thereof in a manner permitting the block 7 to turn about the axis of the cylindrical portion to a limited extent.

10 represents a draft tongue having a bracket member 11 secured to the rear end thereof; the bracket member being pivotally connected with the block 7 by means of a pin 12 arranged vertically.

13 represents a brace member having the front end thereof secured to the axle member 6 and its rear end threaded and adjustably connected with the stub tongue member 2 by means of a bracket member 14 and adjusting nuts 15, and 16 represents draft bars having the rear ends thereof secured to the front end of the brace member 13, and having a draft evener 17 pivotally connected with their front ends. The truck wheels 18 are journaled upon axle members 19 that are provided with vertically arranged stem portions 20 journaled in bearings 21 carried by the axle member 6 and having crank arms 22 at the upper ends thereof that are connected with the draft tongue 10 by means of bars 23 whereby the angles of the truck wheels relative to the line of draft of the machine are controlled in a well-known way.

The operation of the truck is similar to that of others in common use excepting in the means permitting a rocking movement of the axle thereof in the direction of its length about its pivotal connection with the stub tongue member of the implement.

While I have specifically described one embodiment of my invention in this application, it is to be understood that the embodiment shown may be modified without departing from its spirit, and that all such modifications are intended to be included in the scope of this application, as indicated by the appended claims.

What I claim as my invention, and desire to secure by Letters Patent, is:

1. In a tongue truck, a stub tongue having a cylindrical longitudinally protruding end, and a truck axle member journaled on said end.

2. In a tongue truck, a stub tongue having a cylindrical longitudinally extending portion, a truck axle journaled thereon, and means operatively connecting said cylindrical portion and axle and limiting the relative angular movement of the parts.

3. In combination, an implement, a stub tongue connected with said implement, said stub tongue having a longitudinally disposed cylindrical portion at the front end thereof, and a tongue truck including an axle member, a bearing block forming part of said axle member and having the cylindrical portion of said stub tongue journaled therein whereby said axle member may rock about said cylindrical portion in the direction of the length thereof in a plane at right angles with the line of draft of the machine.

4. In combination, an implement, a stub tongue connected therewith, said stub tongue having a longitudinally disposed cylindrical portion at the front end thereof, a tongue truck including an axle member, a cylindrical bearing block forming part of said axle member and having the cylindrical portion of said stub tongue journaled therein whereby said axle member may rock about the cylindrical portion of the tongue, and means operatively connecting said bearing block and the cylindrical portion of said tongue and limiting the relative movement of the parts.

5. In combination, an implement, a stub tongue connected with said implement, a member in one end of which the end of said tongue is seated having a longitudinally extending cylindrical portion on its opposite end, an axle member having a cylindrical portion telescopically receiving said first mentioned cylindrical portion, and means angularly movable with respect to the cylindrical portion of said tongue limiting the angular movement of the cylindrical portion of said axle with respect to said tongue and holding the parts in assembled relation.

6. In combination, an implement, a stub tongue connected with said implement, a draft member secured to the front end of said stub tongue and provided with a forwardly extending cylindrical portion, a tongue truck including an axle member, a bearing block forming part of said axle member and having the cylindrical portion of said draft member journaled therein, and a pin passing through openings in said cylindrical portion and said block, the opening in said block being elongated laterally at opposite ends thereof whereby said axle may rock to a limited extent in a plane at right angles with the line of draft of the machine.

In testimony whereof I affix my signature, in the presence of two witnesses.

CLINTON A. HAGADONE.

Witnesses:
EDW. S. CHARLES,
WILLIAM WEBBER.

Copies of this patent may be obtained for five cents each, by addressing the "Commissioner of Patents, Washington, D. C."